(12) United States Patent
Huang

(10) Patent No.: US 9,677,706 B1
(45) Date of Patent: Jun. 13, 2017

(54) MOTOR BASE HAVING OVERFLOW-PROOF CAPABILITY

(71) Applicant: Hung-Liang Huang, Taichung (TW)

(72) Inventor: Hung-Liang Huang, Taichung (TW)

( * ) Notice: Subject to any disclaimer, the term of this patent is extended or adjusted under 35 U.S.C. 154(b) by 0 days.

(21) Appl. No.: 15/238,166

(22) Filed: Aug. 16, 2016

(51) Int. Cl.
*A47F 5/00* (2006.01)
*F16M 13/02* (2006.01)
(52) U.S. Cl.
CPC .................................. *F16M 13/02* (2013.01)
(58) Field of Classification Search
CPC ......... F16K 17/00; F16M 13/00; F04D 7/065; F04D 29/628
See application file for complete search history.

(56) References Cited

U.S. PATENT DOCUMENTS

| 7,490,642 B1* | 2/2009 | Cooper | B27C 5/10 144/136.95 |
| 8,002,528 B2* | 8/2011 | Hodapp | F01C 21/007 417/363 |
| 9,470,364 B2* | 10/2016 | Cocks | F16P 1/02 |

* cited by examiner

*Primary Examiner* — Amy Sterling
(74) *Attorney, Agent, or Firm* — patenttm.us

(57) ABSTRACT

A motor base has a body, a motor mount, a filter mount, a through hole, a passage, a flange, and at least one overflow hole. The motor mount is formed on the top surface of the body. The filter mount is formed on the bottom surface of the body. The through hole is defined through the body. The flange is formed on the bottom surface of the body and is arranged around the filter mount. The at least one overflow hole is defined radially through the flange.

4 Claims, 8 Drawing Sheets

MOTOR BASE HAVING OVERFLOW-PROOF CAPABILITY

BACKGROUND OF THE INVENTION

1. Field of the Invention

The present invention relates to a motor base, and more particularly to a motor base having an overflow-proof capability.

2. Description of Related Art

With reference to FIGS. 7 and 8, a submerged motor 70 is mounted on a tank 80 with a conventional motor base 60 and is applied to draw cutting oil or cooling oil from the tank 80 to a machine. The amount of the oil in the tank 80 will reduce after a period of use and new oil has to be added into the tank 80. However, the tank 80 of the conventional motor base 60 does not have any overflow-proof structure. When the added amount of the oil is over the volume of the tank 80, the excess oil will flow into the motor 70. At this time, if the motor 70 is turned on, the motor 70 is easily burned out.

To overcome the shortcomings, the present invention tends to provide a motor base to mitigate or obviate the aforementioned problems.

SUMMARY OF THE INVENTION

The main objective of the invention is to provide a motor base having an overflow-proof capability to prevent a motor from burning out.

The motor base has a body, a motor mount, a filter mount, a through hole, a passage, a flange, and at least one overflow hole. The body has a top surface and a bottom surface being opposite the top surface. The motor mount is annular and is formed on and protruding from the top surface of the body. The filter mount is annular, is formed on and protruding from the bottom surface of the body, and is coaxial with the motor mount. The through hole is defined through the body at centers of the motor mount and the filter mount. The passage is inverted L-shaped, is defined in the body, and has a first end at the bottom surface of the body and a second end at a side of the body. The flange is formed on and protrudes from the bottom surface of the body and is arranged around the filter mount. The at least one overflow hole is defined radially through the flange.

Other objects, advantages and novel features of the invention will become more apparent from the following detailed description when taken in conjunction with the accompanying drawings.

DETAILED DESCRIPTION OF PREFERRED EMBODIMENT

Figure 1:
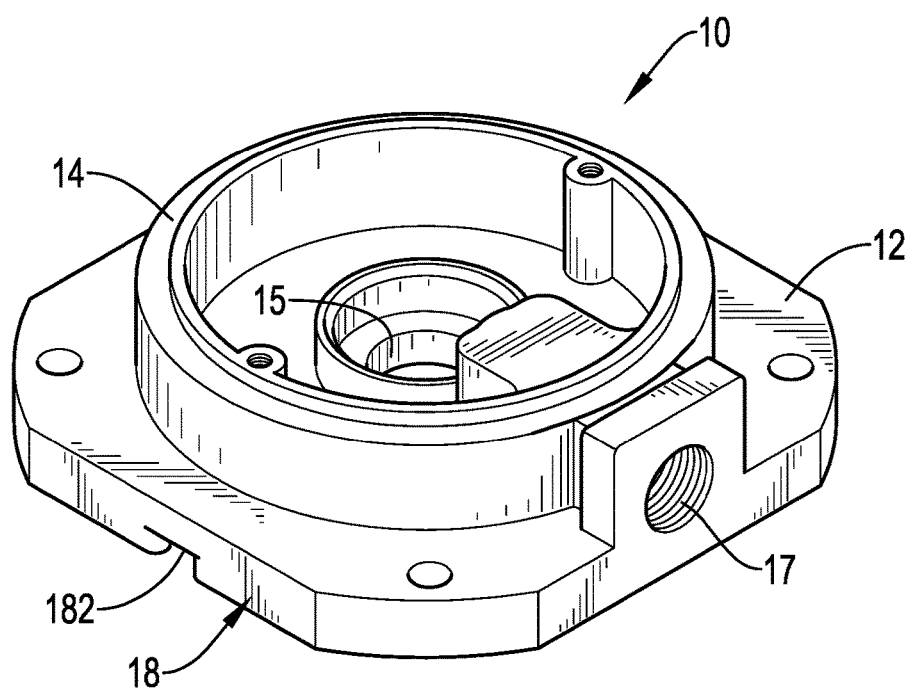
FIG. 1 is a perspective view of a motor base in accordance with the present invention.
Figure 2:
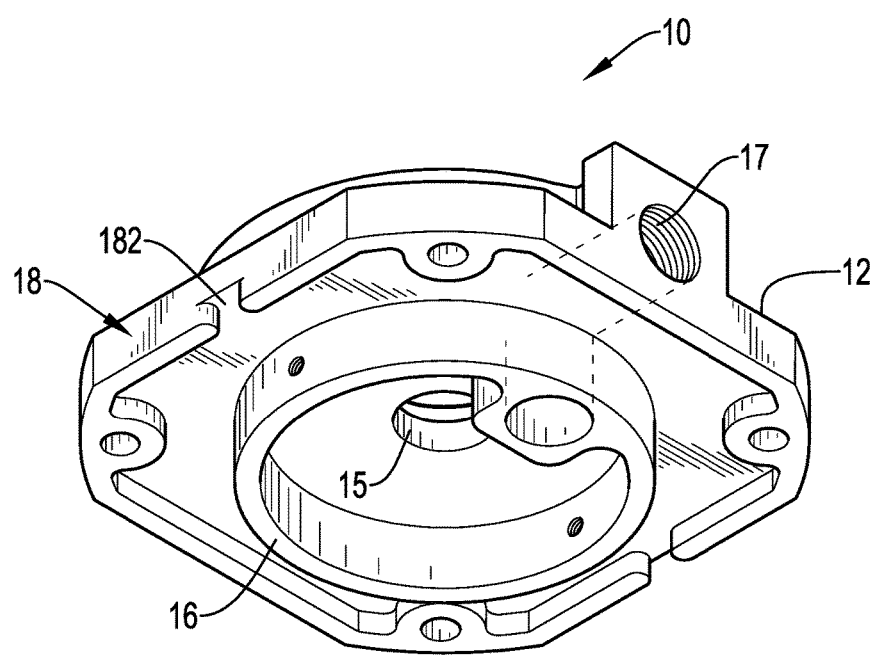
FIG. 2 is another perspective view of the motor base in FIG. 1.
Figure 3:
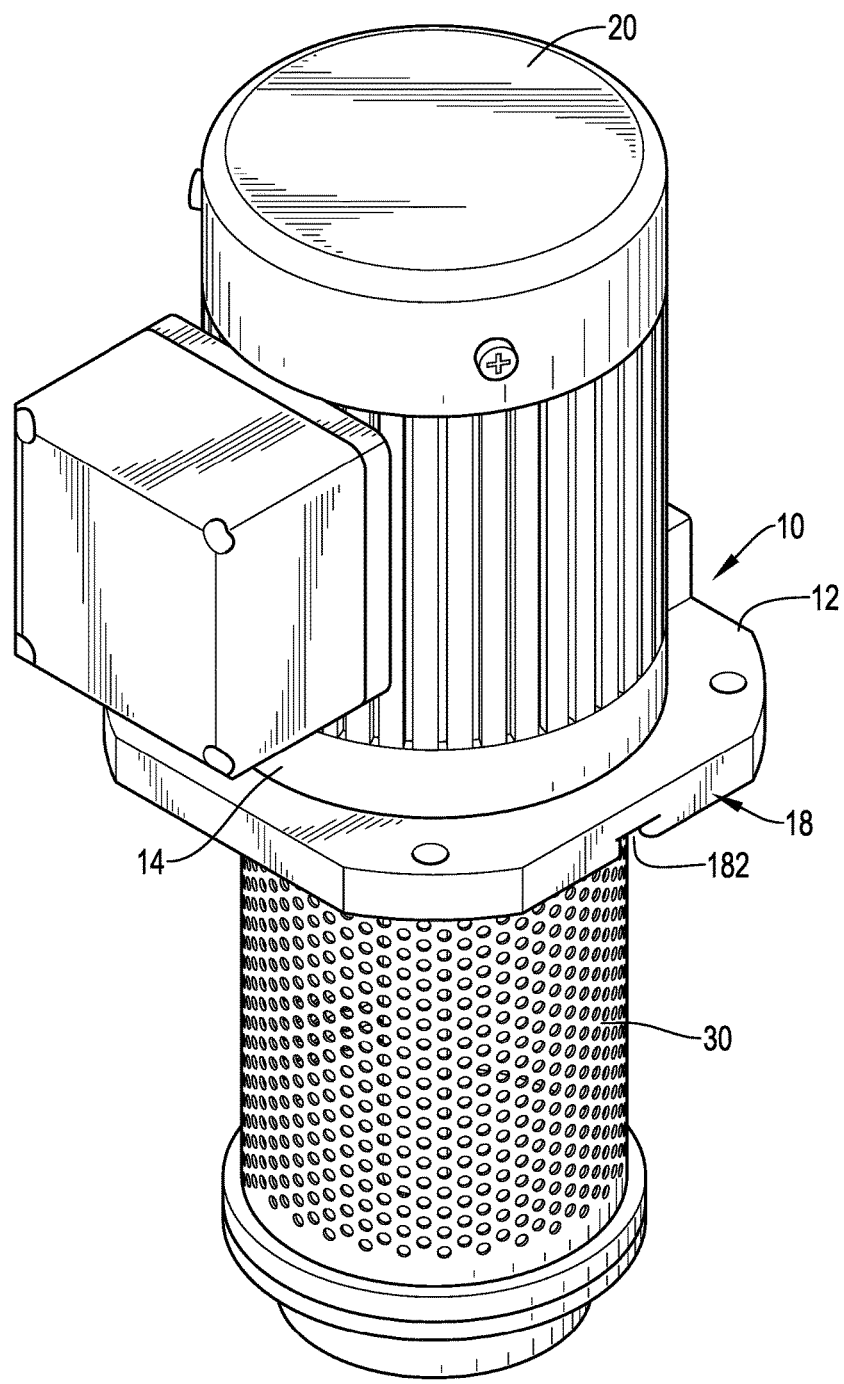
FIG. 3 is a perspective view of a submerged motor with the motor base in FIG. 1.

With reference to FIG. 1, a motor base 10 in accordance with the present invention comprises a body 12, a motor mount 14, a filter mount 16, a through hole 15, a passage 17, a flange 18, and at least one overflow hole 182.

The body 12 has a top surface and a bottom surface being opposite the top surface. Preferably, the body 12 is square in shape. The motor mount 14 is annular and is formed on and protrudes from the top surface of the body 12. The filter mount 16 is annular, is formed on and protrudes from the bottom surface of the body 12, and is coaxial with the motor mount 14. The through hole 15 is defined through the body 12 at centers of the motor mount 14 and the filter mount 16, so the through hole 15 is coaxial with the motor mount 14 and the filter mount 16. The passage 17 is inverted L-shaped, is defined in the body 12, and has a first end at the bottom surface of the body 12 and a second end at a side of the body 12. The flange 18 is annular, is formed on and protrudes from the bottom surface of the body 12, and is arranged around the filter mount 16. Preferably, the flange 18 is formed on and around the periphery of the body 12. The at least one overflow hole 182 is defined radially through the flange. Preferably, the at least one overflow hole 182 is implemented as two in amount. When the body 12 is square in shape, the two overflow holes 182 are located at positions corresponding respectively to two opposite sides of the square body 12.

Figure 4:
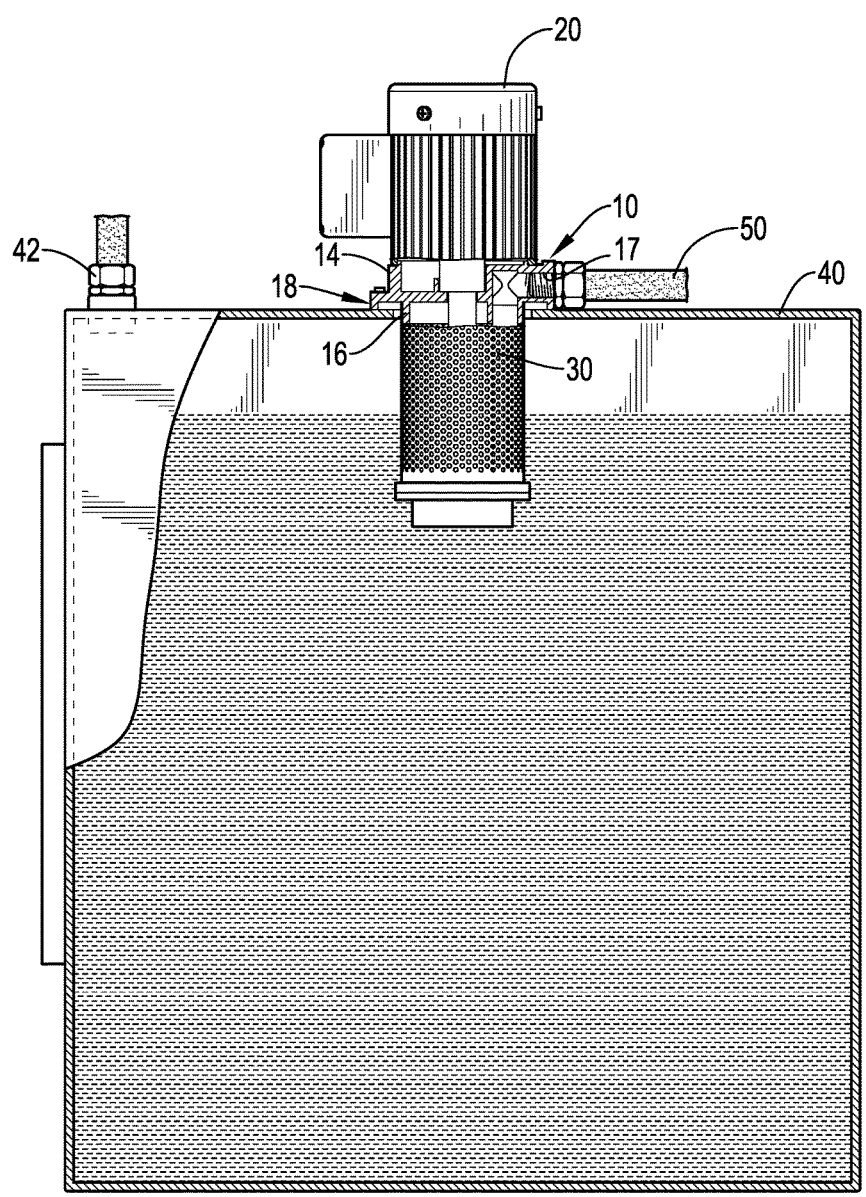
FIG. 4 is a side view in partial section of the submerged motor with the motor base in FIG. 3, shown mounted on a tank.
Figure 5:
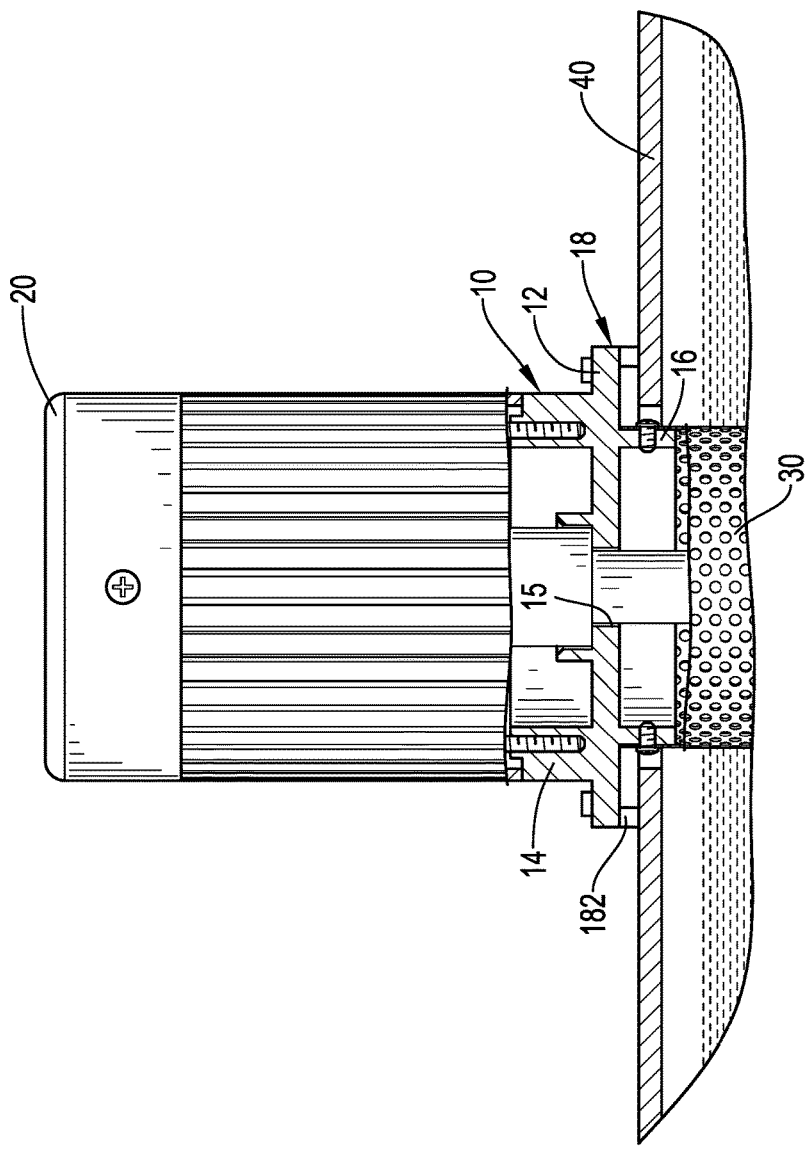
FIG. 5 is an enlarged side view in partial section of the submerged motor with the motor base in FIG. 4.

In use, with reference to FIGS. 4 and 5, a motor 20 is mounted on the motor mount 14, and the shaft of the motor 20 extends through the through hole 15 and protrudes from the bottom surface of the body 12. A tubular filter 30 is attached to the filter mount 16 and is mounted around the shaft. Accordingly, the motor 20 can be securely mounted on a top of a tank 40 by the motor base 10. Oil in the tank 40 can be drawn by the motor 20 to pass through the filter 30 and the passage 17 and guided to a machine by a hose 50 connected with the second end of the passage 17.

Figure 6:
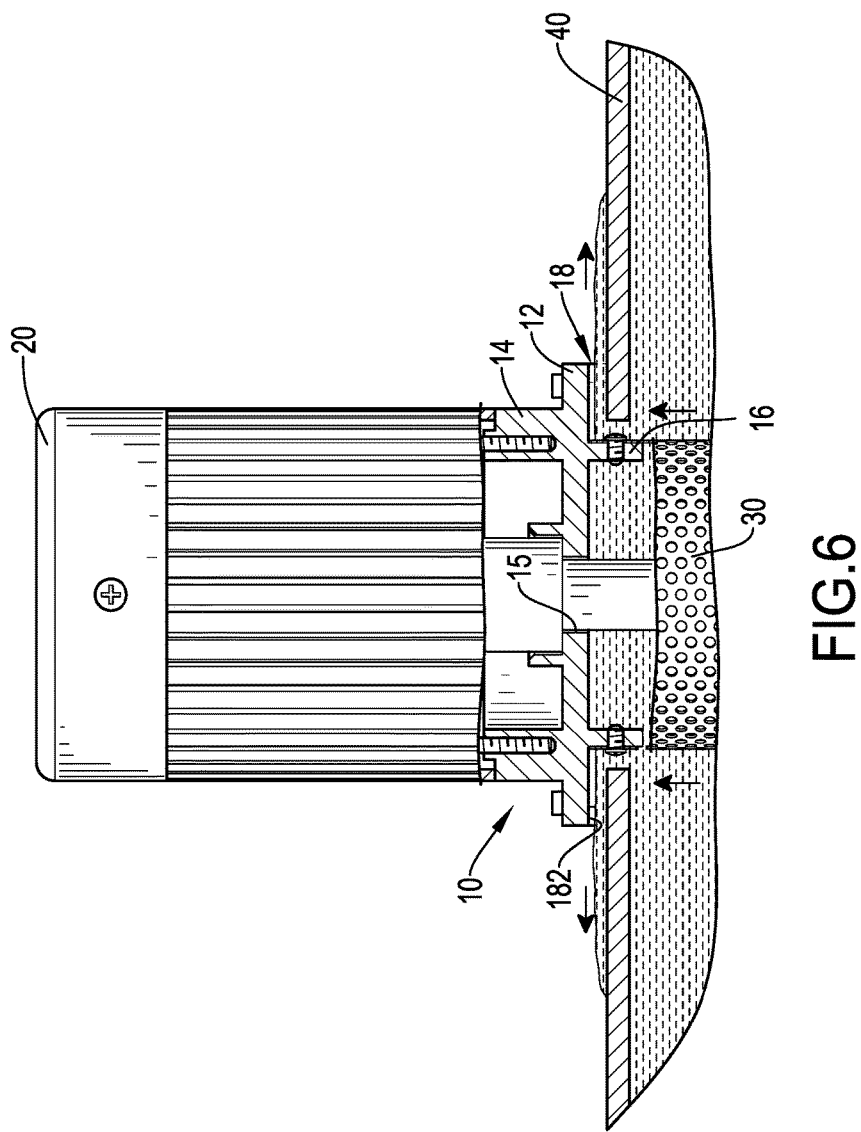
FIG. 6 is an enlarged operational side view in partial section of the submerged motor with the motor base in FIG. 4.
Figure 7:
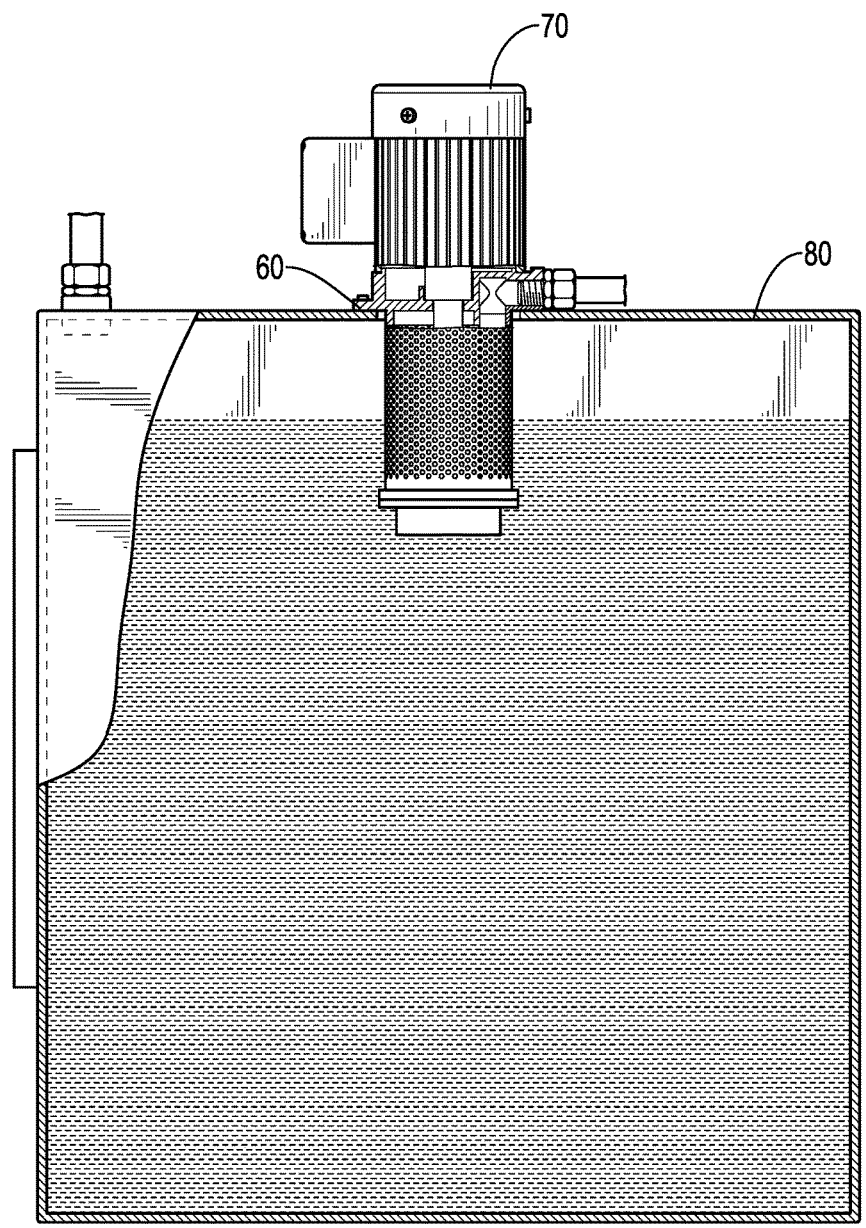
FIG. 7 is a side view in partial section of a submerged motor mounted on a tank with a conventional motor base.
Figure 8:
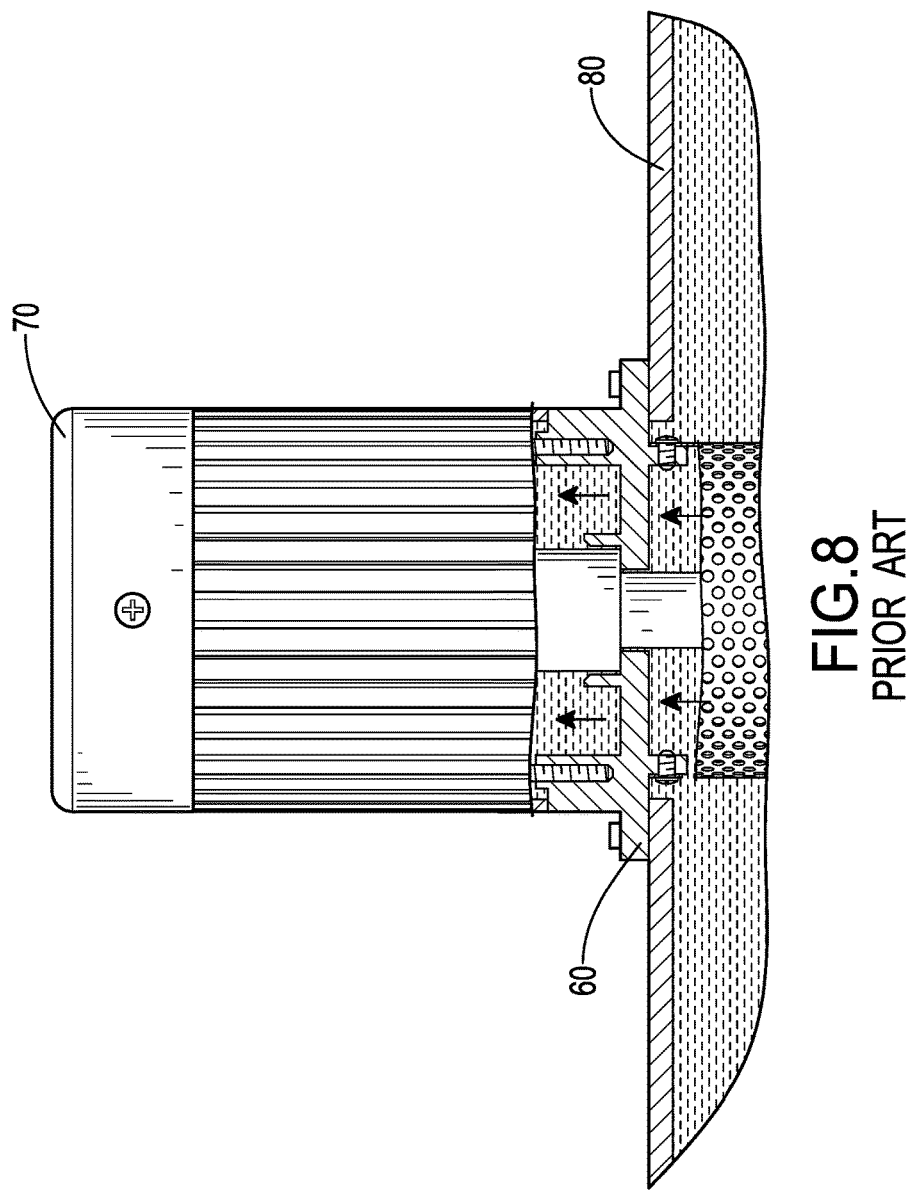
FIG. 8 is an enlarged operational side view in partial section of the submerged motor with the conventional motor base in FIG. 7.

When the level of the oil in the tank 40 is lowered, new oil is added into the tank 40. With reference to FIG. 6, when the tank 40 is fully filled with oil, the redundant oil will flow out of the overflow holes 182 in the flange 18. At this time, the user can be notified to stop adding oil. In addition, the oil can be prevented from flowing into the motor 20 via the through hole 15, so the motor 20 can be kept from burning out. Therefore, the useful life of the motor 20 can be prolonged, and the safety of using the motor 20 can be improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motor base comprising:
    a body having
       a top surface; and
       a bottom surface being opposite the top surface;
    an annular motor mount formed on and protruding from the top surface of the body;
    an annular filter mount formed on and protruding from the bottom surface of the body and being coaxial with the motor mount;
    a through hole defined through the body at centers of the motor mount and the filter mount;
    an inverted L-shaped passage defined in the body and having a first end at the bottom surface of the body and a second end at a side of the body;
    a flange formed on and protruding from the bottom surface of the body and arranged around the filter mount; and
    at least one overflow hole defined radially through the flange.

2. The motor base as claimed in claim 1, wherein the body has a periphery; and
    the flange is formed on and around the periphery of the body.

3. The motor base as claimed in claim 2, wherein
    the body is square in shape;
    the at least one overflow hole is implemented as two in amount; and
    the two overflow holes are located at positions correspondingly respectively to two opposite sides of the square body.

4. The motor base as claimed in claim 1, wherein
    the body is square in shape;
    the at least one overflow hole is implemented as two in amount; and
    the two overflow holes are located at positions correspondingly respectively to two opposite sides of the square body.

* * * * *